United States Patent [19]
Nagayama et al.

[11] Patent Number: 5,637,130
[45] Date of Patent: Jun. 10, 1997

[54] METHOD AND FURNACE FOR DRAWING OPTICAL FIBERS

[75] Inventors: Katsuya Nagayama; Kohei Kobayashi; Hiroaki Ohta; Ichiro Tsuchiya, all of Kanagawa, Japan

[73] Assignee: Sumitomo Electric Industries, Inc., Osaka, Japan

[21] Appl. No.: 403,765

[22] PCT Filed: Jul. 12, 1994

[86] PCT No.: PCT/JP94/01132

§ 371 Date: Jul. 13, 1995

§ 102(e) Date: Jul. 13, 1995

[87] PCT Pub. No.: WO95/02560

PCT Pub. Date: Jan. 26, 1995

[30] Foreign Application Priority Data

Jul. 13, 1993 [JP] Japan ................................. 5-172820

[51] Int. Cl.$^6$ ................................. C03B 37/027
[52] U.S. Cl. ................................. 65/435; 65/513; 65/533; 65/510
[58] Field of Search ................................. 65/424, 435, 513, 65/434, 533, 510

[56] References Cited

U.S. PATENT DOCUMENTS

| | | |
|---|---|---|
| 4,309,201 | 1/1982 | Klop .......................... 65/424 |
| 4,547,644 | 10/1985 | Bair .......................... 65/435 |
| 4,578,098 | 3/1986 | Paek .......................... 65/434 |
| 4,673,427 | 6/1987 | Van Der Giessen et al. . |

FOREIGN PATENT DOCUMENTS

| | | |
|---|---|---|
| 59-88336 | 5/1984 | Japan . |
| 62-138340 | 6/1987 | Japan . |
| 6418934 | 1/1989 | Japan .......................... 65/435 |
| 26346 | 1/1990 | Japan .......................... 65/435 |
| 2-212329 | 8/1990 | Japan . |
| 3-32502 | 7/1991 | Japan . |
| 4-310533 | 11/1992 | Japan .......................... 65/434 |
| 4-321535 | 11/1992 | Japan .......................... 65/434 |
| 6-100328 | 4/1994 | Japan .......................... 65/510 |

*Primary Examiner*—John Hoffmann
*Attorney, Agent, or Firm*—Cushman Darby & Cushman, IP Group of Pillsbury Madison & Sutro, LLP

[57] ABSTRACT

A furnace and method for drawing an optical fiber is provided. The furnace included a furnace core chamber in which a preform is inserted into the chamber through the upper end thereof and a drawn optical fiber is pulled out of the chamber through an opening positioned at the lower end thereof. The furnace also includes a gas-supply means for introducing an inert gas into the furnace core chamber to thus establish an inert gas atmosphere within the chamber, and a heater for heating the preform so that the lower part of the preform is molten and drawn into the optical fiber, which is positioned around the outer periphery of the furnace core chamber. The furnace further includes an inner furnace core tube, which is positioned within the furnace core chamber and which has a cylindrical part whose lower part is communicated to the opening of the furnace core chamber and a funnel-like part which is positioned on the upper end of the cylindrical part. The funnel-like part has a diameter gradually and upwardly increased so as to surround the lower portion of the molten portion of the preform.

11 Claims, 7 Drawing Sheets

METHOD AND FURNACE FOR DRAWING OPTICAL FIBERS

TECHNICAL FIELD

The present invention relates to a furnace and method for drawing an optical fiber and in particular to a furnace and method capable of drawing an optical fiber having only a slight variation in the outer diameter.

BACKGROUND ART

An optical fiber is in general formed by drawing while heating and melting a transparent glass mass or tube called an optical fiber preform (preform) in an optical fiber-drawing furnace.

FIG. 1 shows an embodiment of an optical fiber-drawing furnace according to the conventional technique. Drawing furnaces as shown in FIG. 1 are disclosed in, for instance, Japanese Patent Application Publication No. 3-24421.

As seen from FIG. 1, a furnace body 11 made of stainless steel is in general provided therein with a heater 13 for heating and melting an optical fiber preform 12. A furnace core tube 14 in which the foregoing preform 12 is inserted through the top thereof is positioned inside the heater 13.

The furnace core tube 14 is in general composed of a carbon material and fixed to the furnace body 11 at both upper and lower ends of the latter. The furnace core tube 14 comprises an upper cylindrical part 14a, a funnel-like part 14b, and a lower cylindrical part 14c. The upper cylindrical part 14a is composed of a cylinder having a diameter slightly greater than that of the preform 12. The lower cylindrical part 14c, has a diameter which is smaller than that of the preform 12 and permits the passage of a drawn optical fiber 15. The funnel-like part 14b, is positioned between the upper and lower cylindrical parts 14a and 14c, and thus serves to connect the upper cylindrical part 14a to the lower cylindrical part 14c. The funnel like part 14b has a shape whose diameter is gradually reduced in a direction from the upper portion to the lower portion thereof along the molten portion at the lower end of the preform 12 which is drawn into the optical fiber 15.

An annular thermal insulating material 16 comprising, for instance, a carbon felt material is disposed between the furnace body 11 and the heater 13 so as to prevent any external diffusion of the heat radiated from the heater 13.

Moreover, an upper cylindrical member 17 which is communicated with the upper end of the furnace core tube 14 is disposed on the top of the furnace body 11. This upper cylindrical member 17 is usually made of stainless steel and the upper opening thereof is covered with a cap member 18. Further the upper cylindrical member 17 is provided with a gas introduction port 17a at an upper portion thereof. On the other hand, a lower cylindrical member 19 is positioned at the bottom of the furnace body 11 and is communicated with the lower end of the furnace core tube 14. The lower cylindrical member 19 is commonly formed from stainless steel and is provided, at the lower end thereof, with an opening 19a through which the drawn optical fiber 15 can pass.

An inert gas 20 such as $N_2$ and He is supplied to the upper cylindrical member 17 through the gas introduction port 17a. The inert gas 20 establishes an inert gas atmosphere within the furnace core tube 14 and is discharged through the opening 19a of the lower cylindrical member 19. The inert gas 20 serves to protect the furnace core tube 14 and the preform from oxidation and to thus keep the internal space of the furnace core tube 14 clean.

Incidentally, the aforementioned furnace core tube 14 is not a cylinder having a uniform diameter over the entire length thereof, but is provided with, at the lower part thereof, the funnel-like part 14b, and the lower cylindrical part 14c. These funnel-like and lower cylindrical parts 14b, and 14c, are incorporated into the drawing furnace for the purpose of preventing any variation in the outer diameter of the optical fiber 15 during drawing the optical fiber. More specifically, the space formed between the inner wall of the furnace core tube 14 and the preform 12 is almost identical to that formed between the inner wall of the furnace core tube and the optical fiber 15 drawn therefrom, along the fiber-drawing direction when core tube is provided with a funnel-like part 14b. This arrangement ensures the inhibition of any turbulent current of the inert gas within the space, as will be apparent from the disclosures of the prior art such as Japanese Patent Application Publication No. 3-24421 listed above.

In the conventional drawing furnace as shown in FIG. 1, however, the cross sectional area of the foregoing space is gradually decreased at the narrowed down portion, i.e., the funnel-like part of the furnace core tube 14 and, therefore, the flow rate of the gas downwardly flowing through the furnace core tube is increased at the narrowed down portion. For this reason, the gas flow rate near the molten portion of the preform is higher than that observed when a straight furnace core tube free of such a narrowed down portion is used. As a result, the molten portion of the preform would undergo change in its shape greater than that observed when such a straight furnace core tube free of such a narrowed down portion is used, thereby causing variations in the diameter of the optical fiber drawn from the preform.

In addition, Japanese Utility Model Application Publication No. 63-127947 discloses a method for drawing an optical fiber which makes use of a drawing furnace comprising a furnace core tube provided with a funnel-like part. According to this method, an inert gas is introduced into the furnace through an outlet for the drawn optical fiber positioned at the lower part thereof. In this method, however, the tip of the molten portion of the preform and the optical fiber immediately after drawing would come in contact with a gas atmosphere having non-uniform temperature distribution due to insufficient heating. As a result, the drawn optical fiber is non-uniformly solidified and thus the resulting optical fiber is liable to have variations in its diameter.

As has been discussed above, the problems of the occurrence of a turbulent current in a gas flow and non-uniform temperature distribution in the drawing furnace cannot satisfactorily be solved by simply forming the lower portion of a furnace core tube into a funnel-like shape, since this arrangement does not sufficiently prevent the variations in the outer diameter of the resulting optical fiber.

On the other hand, Japanese Utility Model Application Publication No. 3-32502 and Japanese Patent Application Laying-open No. 59-88336 each discloses a drawing furnace as shown in FIG. 2. In the drawing furnace shown in FIG. 2, all the members, which have functions identical to those of the members of the drawing furnace shown in FIG. 1, bear the same reference numerals and the details thereof are herein omitted to avoid duplication. The drawing furnace is provided with a first furnace core tube 21 which is a cylinder having the same diameter over the entire length and the upper and lower ends of the furnace core tube 21 are fixed to a furnace body 11, respectively. A lower cylindrical member 22 is disposed on the lower end of the furnace body 11 so as to be in communication with the lower end of the core tube 21. An opening 22a is formed at the lower end of the lower cylindrical member 22 and a drawn optical fiber 15 can pass therethrough. Moreover, a gas discharge port 22b is formed on the lower periphery of the lower cylindrical member 22. In addition, a second furnace core tube 23 having a diameter smaller than that of the first core tube 21 is positioned below the core tube 21 and within the lower cylindrical member 22. The second furnace core tube 23 made of, for instance, a carbon material is communicated to the opening 22a of the lower cylindrical member 22 and has a cylindrical shape which permits the passage of the drawn optical fiber 15 therethrough. The lower end of this second furnace core tube 23 is adhered to and supported by the peripheral portion of the opening 22a of the lower cylindrical member 22.

However, the second furnace core tube 23 is a straight cylinder and covers only the drawn optical fiber 15. Moreover, the second furnace core tube 23 simply covers the portion of the molten preform having a reduced diameter approximately identical to that of the optical fiber 15 even if the upper end of the second furnace core tube covers the lower end of the molten portion of the preform 12.

When an optical fiber 15 is produced by drawing an optical fiber preform 12 in such a drawing furnace, the flow of an inert gas 20 supplied through a gas introduction port 17a is disturbed near the molten portion of the preform 12. In particular, the gas flow is, in the vicinity of the upper end of the second furnace core tube 23, divided into a gas flow 20a which runs through the interior of the second tube 23 and is then discharged through the opening 22a and a gas flow 20b which passes through the exterior of the second tube 23 and is then discharged through the gas discharge port 20b. Accordingly, the gas flow is markedly disturbed at that portion. The gas flow thus disturbed comes in contact with the lower part of the molten portion of the preform 12, i.e., the gas molecules collide with the molten portion of the preform 12. This causes vibrations of the molten portion and in turn the resulting optical fiber 15 drawn therefrom has variations in its diameter. Moreover, the heat transfer efficiency between the gas flow and the molten portion of the preform is greatly influenced by such a turbulent current in the gas flow and this also becomes a cause of variations in the diameter of the resulting optical fiber. Furthermore, since the gas flow is disturbed at the upper portion of the second furnace core tube 23, a stable gas flow is not established within the second furnace core tube 23 and this also becomes an additional cause of variations in the diameter of the resulting optical fiber 15.

DISCLOSURE OF THE INVENTION

An object of the present invention is to provide a furnace for drawing an excellent optical fiber free of any variation in the diameter, which can substantially suppress the turbulence of a gas flow within a furnace core tube and can ensure a uniform temperature distribution of the gas flow.

Another object of the present invention is to provide a method for drawing an optical fiber which can substantially suppress the turbulence of a gas flow within a furnace core tube and can ensure a uniform temperature distribution of the gas flow and thus can provide an excellent optical fiber free of any variation in the diameter.

According to an aspect of the present invention, the foregoing objects can effectively be accomplished by providing a furnace for drawing an optical fiber which includes a structure defining a furnace core chamber wherein an optical fiber preform is inserted into the chamber through the upper end thereof and a drawn optical fiber is pulled out of the chamber through an opening positioned at the lower end thereof. The furnace also includes a gas-supply means for introducing an inert gas into the furnace core chamber to thus establish an inert gas atmosphere within the chamber, and a means for heating the preform so that the lower part of the preform is molten and drawn into the optical fiber, which is positioned around the outer periphery of the structure. The furnace also includes an inner furnace core tube which is positioned within the furnace core chamber and which comprises a cylindrical part whose lower part is communicated to the opening of the chamber and a funnel-like part which is positioned on the upper end of the cylindrical part, the funnel-like part having a diameter which is gradually and upwardly increased and surrounds the lower portion of the molten preform.

In this respect, the gas-supply means is, for instance, designed in such a manner that the inert gas is supplied to the chamber through the upper part thereof, so that a portion of the gas is discharged through the opening of the chamber after passing through the interior of the inner furnace core tube and so that the remaining portion of the gas is discharged through a discharge port positioned at the lower part of the chamber after passing through the exterior of the inner furnace core tube.

In addition, the gas-supply means is, for instance, designed in such a manner that the gas is introduced into the chamber through a gas introduction port disposed at the lower portion of the chamber and heated in a space formed between the inner wall of the structure and the inner furnace core tube. In this manner a portion of the heated gas is guided to the interior of the inner furnace core tube through the funnel-like part and discharged through the opening, and the remaining portion of the gas is discharged through a gas-discharge port positioned at the upper portion of the furnace core chamber.

Moreover, the upper end of the funnel-like part of the inner furnace core tube is, for instance, positioned above the lower molten portion of the preform, which has an outer diameter of at least 10 mm.

In the drawing furnace, at least one portion of the upper periphery of the funnel-like part of the inner furnace core tube is, for instance, brought into contact with the inner wall of the structure via a projection.

In the drawing furnace, the structure comprises, for instance, a cylindrical furnace core tube, an upper cylindrical member which is communicated to the upper end of the cylindrical furnace core tube and which is provided with a port for allowing a gas pass through at the upper portion thereof, and a lower cylindrical member which is communicated to the lower end of the cylindrical furnace core tube and which is provided with a port for allowing a gas pass through at the lower portion thereof.

According to another aspect of the present invention, the foregoing objects can effectively be accomplished by providing a method for drawing an optical fiber, which comprises the steps of providing a structure having an inner surface defining a furnace core chamber; inserting a preform through the upper end of the furnace core chamber provided therein with an inner furnace core tube comprising a cylindrical part whose lower end is communicated to an opening of the chamber through which an optical fiber is drawn and a funnel-like part having a diameter which gradually and upwardly increases; supplying an inert gas to the furnace core chamber to establish an inert gas atmosphere within the chamber; melting the lower portion of the preform by operating a heating means which is positioned so as to enclose the furnace core chamber while arranging the lower molten portion so as to be surrounded by the funnel-like part of the inner furnace core tube; and pulling out an optical fiber drawn from the molten portion of the preform through the opening.

In the optical fiber-drawing method, for instance, the inert gas is supplied to the chamber through the upper part thereof, a portion of the gas is discharged through the opening of the chamber after passing through the interior of the inner furnace core tube, and the remaining portion of the gas is discharged through a discharge port positioned at the lower portion of the chamber after passing through the exterior of the inner furnace core tube.

In addition, the inert gas is introduced into the chamber through a gas introduction port disposed at the lower portion of the chamber and heated in a space formed between the inner wall of the structure and the inner furnace core tube, a portion of the heated gas is guided to the interior of the inner furnace core tube through the funnel-like part and discharged through the opening, while the remaining portion of the gas is discharged through a gas-discharge port positioned at the upper portion of the furnace core chamber.

DETAILED EXPLANATION OF THE INVENTION

Preferred embodiments of the optical fiber-drawing furnace according to the present invention will hereunder be detailed with reference to the accompanying drawings.
(Embodiment 1)

Figure 3:
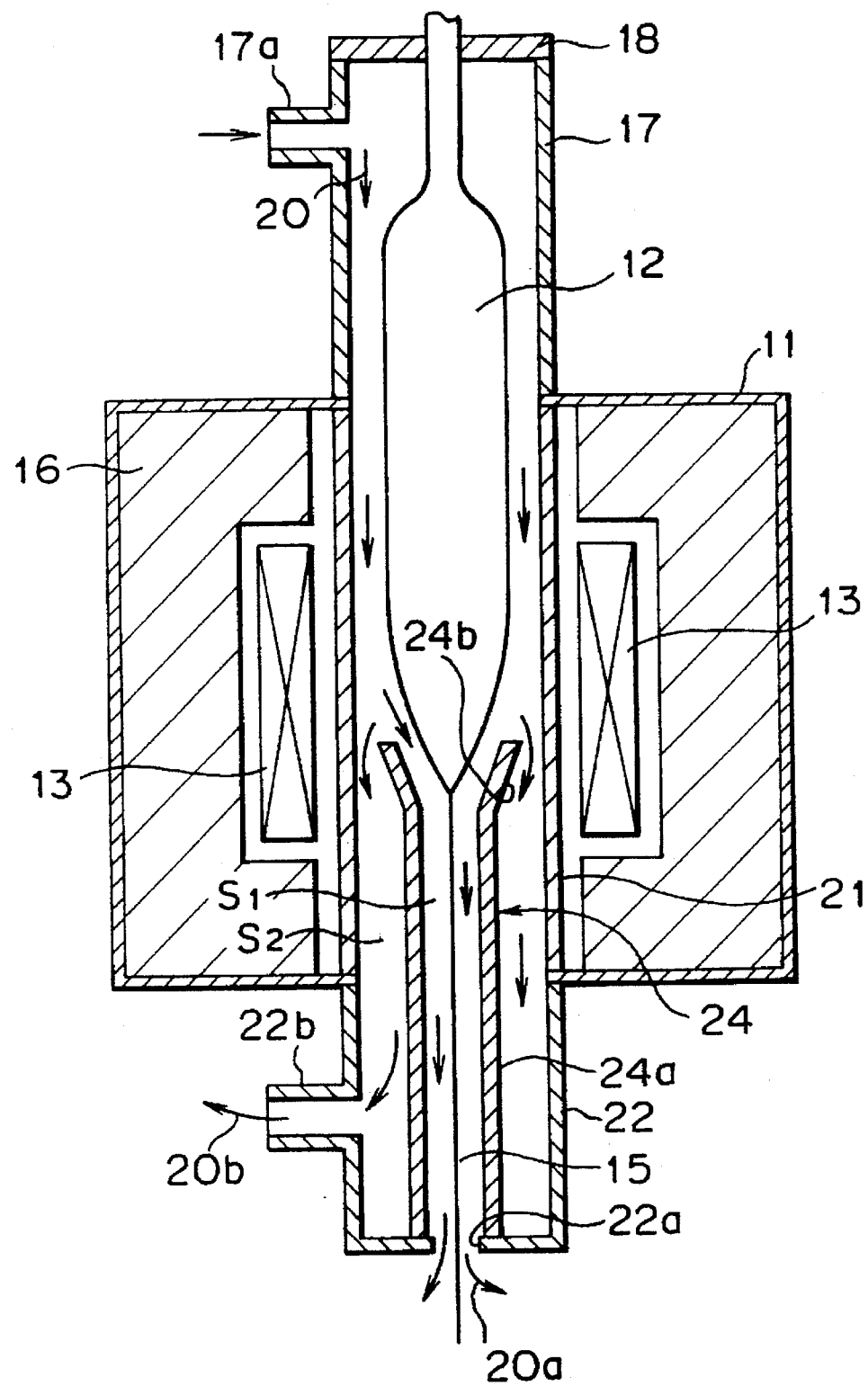
FIG. 3 is a cross sectional view showing a schematic structure of the optical fiber-drawing furnace according to Embodiment 1 of the present invention.

The structure of the optical fiber-drawing furnace according to this Embodiment is schematically shown in FIG. 3. In FIG. 3, all the structural features, which have functions identical to those of the members shown in FIG. 1, bear the same reference numerals. As shown in FIG. 3, a furnace body 11 is provided therein with an electric heater 13 for heating and melting an preform 12. A cylindrical furnace core tube 21, in which the preform 12 is inserted through the upper portion thereof, is arranged inside the heater 13 and has upper and lower ends fixed to the furnace body 11. The furnace body 11 is, on the top side thereof, provided with an upper cylindrical member 17 which is communicated to the upper end of the first furnace core tube 21, while the furnace body 11 is, on the lower end thereof, provided with a lower cylindrical member 22 which is communicated to the lower end of the cylindrical furnace core tube 21. Thus, a structure defining a furnace core chamber is formed from the cylindrical furnace core tube 21, the upper cylindrical member 17 and the lower cylindrical member 22. An annular heat insulating material 16 is arranged between the furnace body 11 and the heater 13 to prevent external radiation of heat generated by the heater 13.

An inner furnace core tube 24 is positioned within the furnace core chamber. The inner furnace core tube 24 comprises a cylindrical portion 24a which surrounds a drawn optical fiber 15 and whose lower end is adhered to the periphery of an opening 22a of the lower cylindrical member 22. The inner furnace core tube 24 further comprises a funnel-like part 24b having a diameter gradually and upwardly increased, which extends from and is contiguous to the upper end of the cylindrical part 24a. The funnel-like part 24b is designed in such a manner that is surrounds the lower end of the molten portion of the preform 12 and upwardly spreads along the molten portion.

The furnace core chamber is provided with a gas-supply means so that an inert gas atmosphere can be established within the chamber. More specifically, the upper opening of the upper furnace core tube 17 is closed with a cap member 18 and a port 17a for allowing a gas to pass therethrough is formed on the upper side wall of the upper cylindrical member 17. In addition, an opening 22a is formed on the lower end of the lower cylindrical part 22 and serves to guide the drawn optical fiber 15, while a port 22b for allowing a gas to pass therethrough is positioned on the lower side wall of the member 22. In this embodiment, an inert gas-supply device (not shown) for introducing an inert gas such as $N_2$ or He is connected to the gas port 17a of the upper cylindrical part 17.

When such a drawing furnace is used for drawing an optical fiber, an inert gas 20 such as $N_2$ or He is introduced into the furnace core chamber through the gas port 17a of the upper cylindrical part 17 using the inert gas-supply device (not shown). In this respect, the inert gas 20 thus introduced is heated by the heater 13 and is heated to at highest 2200° C. during passage through the upper cylindrical part 17 and the upper portion of the cylindrical furnace core tube 21. The insert gas 20 then arrives at the lower molten portion of the preform 12. At this stage, a portion of the heated inert gas 20 flows into the funnel-like part 24b of the inner furnace core tube 24, passes through the inner space $S_1$ of the inner furnace core tube 24 and is externally discharged, as a gas 20a, through the opening 22a of the lower cylindrical member 22. On the other hand, the remaining inert gas 20 passes through the gap formed outside the funnel-like part 24b of the inner furnace core tube 24, downwardly runs through the space $S_2$ formed between the inner furnace core tube 24 and the inner wall of the structure and is discharged, as a gas 20b, through the gas port 22b. Incidentally, the optical fiber 15 is usually cooled to about 1200° C. at the outlet of the chamber.

Figure 1:
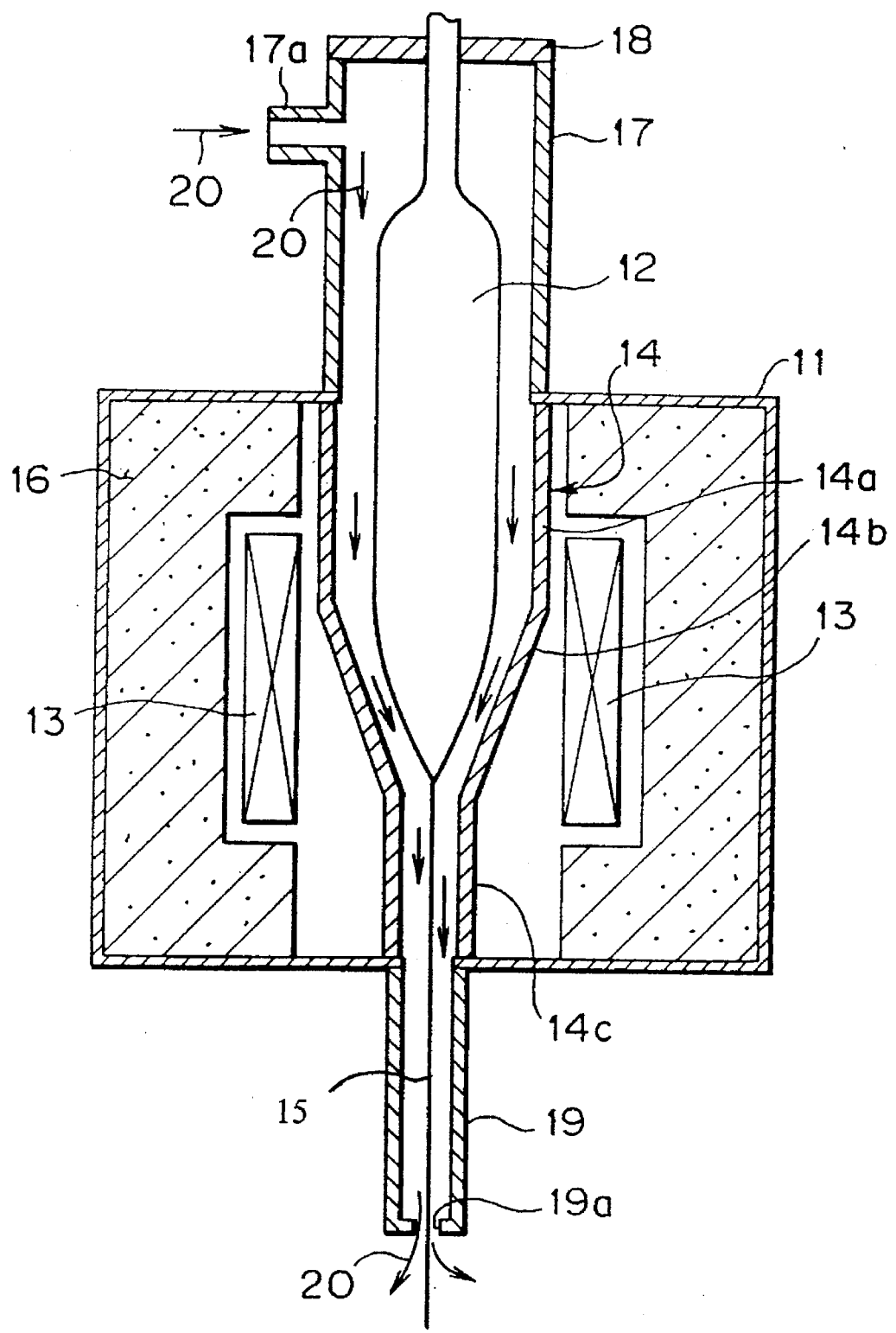
FIG. 1 is a cross sectional view showing a schematic structure of a conventional optical fiber-drawing furnace.

As has been discussed above in detail, the drawing furnace according to this embodiment is, within the furnace core chamber, provided with the inner furnace core tube 24 comprising the funnel-like part 24b which surrounds the lower molten portion of the preform 12. Thus, the problem of any turbulent current in the gas flow near the molten portion of the preform can be solved since the lower molten portion of the preform 12 is surrounded by the funnel-like part 24b. Moreover, a portion of the heated inert gas 20 flows into the space $S_2$ outside the inner furnace core tube 24 and, therefore, the gas flow rate and the gas pressure are not increased in the vicinity of the lower molten portion of the preform due to the gas flowing into the inner furnace core tube 24, unlike the furnace core tube having a structure as shown in FIG. 1. For this reason, any deflection of the drawn optical fiber and any variation in the diameter thereof can be inhibited.

In this embodiment, the gas 20b is cooled by the outside air through the lower cylindrical member 22, while the gas 20a within the inner furnace core tube 24 is not directly cooled by the outside air. The drawn optical fiber 15 is surrounded by the gas 20a which is not directly cooled by the outside air. Therefore, the drawn optical fiber 15 is gradually cooled and any variation in the diameter can correspondingly be inhibited.

An optical fiber was produced using the drawing furnace shown in FIG. 3 (Example 1). The results thus obtained are summarized below. In Example 1, the inert gas 20 was He which was supplied to the furnace at a flow rate of 30 l/min; the drawing speed of the optical fiber 15 was set at 500 m/min. Separately, an optical fiber was likewise produced using the drawing furnace shown in FIG. 1 (Comparative Example 1). The results obtained in Comparative Example 1 are also listed below.

TABLE 1

|  | Example 1 | Comp. Example 1 |
| --- | --- | --- |
| Variation in Outer Diameter |  |  |
| short period; 5 sec. | ±0.2 µm | ±0.3 µm |
| long period; 1 hr. | ±0.4 µm | ±0.8 µm |
| Electric Power | 22 kW | 20 kW |

The electric power required in Example 1 was about 10% greater than that required in Comparative Example 1 since the lower portion of the furnace core tube had a double-structure. However, the variation in the outer diameter was ±0.2 µm for the short period and ±0.4 µm for the long period. In other words, it could be reduced to about 67% and 50% of Comparative Example 1 (±0.3 µm and ±0.8 µm), respectively.

(Embodiment 2)

Figure 4:
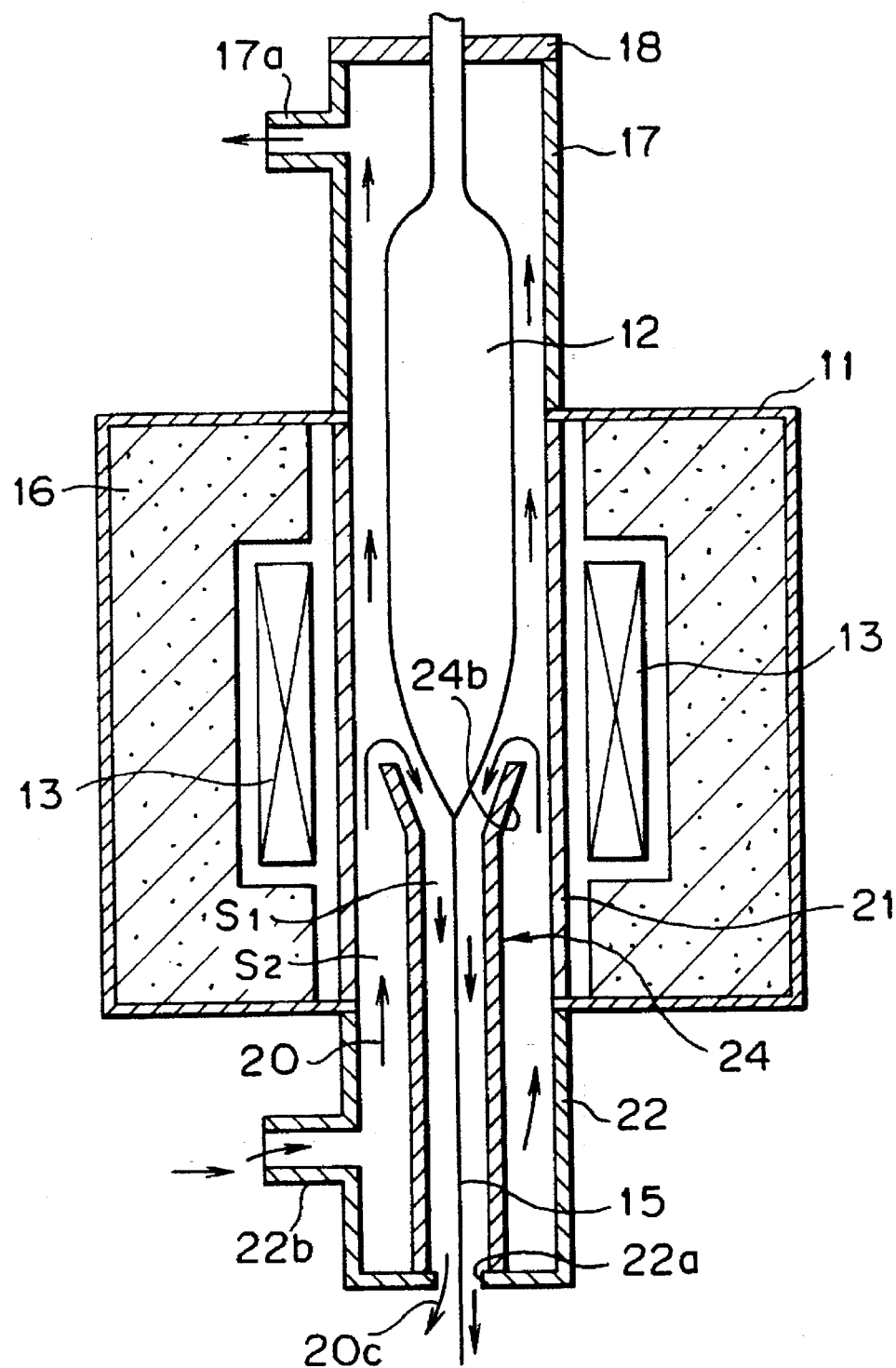
FIG. 4 is a cross sectional view showing a schematic structure of the optical fiber-drawing furnace according to Embodiment 2 of the present invention.

The drawing furnace according to this embodiment is schematically shown in FIG. 4. The structure of the drawing furnace is fundamentally identical to that shown in FIG. 3, but differs from the latter in that a gas-supply device (not shown) is connected to a gas port 22b of a lower cylindrical member 22. In this embodiment, all the members, which are identical to those shown in FIG. 3, bear the same reference numerals and the explanation thereof are omitted to avoid duplication. As shown in FIG. 4, if an inert gas 20 is supplied to the drawing furnace through the gas port 22b, the gas 20 is heated during passage through the space $S_2$ formed between the inner wall of a structure defining a furnace core chamber and an inner furnace core tube 24. A portion of the supplied gas 20, which has been heated while passing through space $S_2$, flows into an inner furnace core tube 24 through the gap formed between the funnel-like part 24b of the core tube 24 and the preform 12. The gas 20c which flows into the inner core tube 24 flows through the space $S_1$ along the molten portion of the preform 12 and is discharged through an opening 22a of the lower cylindrical member 22. On the other hand, the remaining gas 20d upwardly runs through the furnace core chamber and is discharged through a port 17a.

As has been explained above the drawing furnace according to this embodiment comprises the inner furnace core tube 24 provided with the funnel-like part 24b which surrounds the lower molten portion of the preform 12, and is disposed within the furnace core chamber. The funnel-like part 24b thus surrounds the lower molten portion of the preform 12 and accordingly, no turbulent current in the heated inert gas flow is generated around the molten portion of the preform. Moreover, a part of the heated inert gas 20 flows into the space $S_1$ within the inner furnace core tube 24 and, therefore, the gas flow rate and the gas pressure are not increased near the lower molten portion of the preform due to the gas flowing into the funnel-like part 24b, unlike the furnace core tube having a structure as shown in FIG. 1. For this reason, any deflection of the drawn optical fiber and any variation in the diameter thereof can be eliminated.

If the drawing furnace is provided with a gas-supply means designed in such a manner that an inert gas is introduced into the furnace through the lower part of the furnace core chamber as has been explained above, the furnace shows effects identical to those achieved by Embodiment 1. In addition, the inert gas 20 heated in the space formed outside the inner furnace core tube 24 is fed to the interior of the inner furnace core tube 24 at the lower portion of the furnace core chamber. Therefore, the molten portion of the preform 12 and the optical fiber 15 immediately after drawing do not come in contact with the cold gas and as a result, the variation in the outer diameter of the resulting optical fiber 15 is limited to a very low level.

An optical fiber was produced using the drawing furnace shown in FIG. 4 (Example 2). The results thus obtained are summarized below. In Example 2, the inert gas 20 was He which was supplied to the furnace at a flow rate of 30 l/min; the drawing speed of the optical fiber 15 was set at 500 m/min. Separately, an optical fiber was likewise produced using the drawing furnace shown in FIG. 1 (Comparative Example 2). The results obtained in Comparative Example 2 are also listed below.

TABLE 2

|  | Example 2 | Comp. Example 2 |
| --- | --- | --- |
| Variation in Outer Diameter | ±0.2 µm | ±0.5 µm |
| Electric Power | 22 kW | 20 kW |

The electric power required in Example 2 was about 10% greater than that required in Comparative Example 2 since the lower portion of the furnace core tube had a double-structure. However, the variation in the outer diameter could be suppressed to a level of ±0.2 µm, i.e., about 40% of Comparative Example 2 (±0.5 µm). (Embodiment 3)

Figure 5:
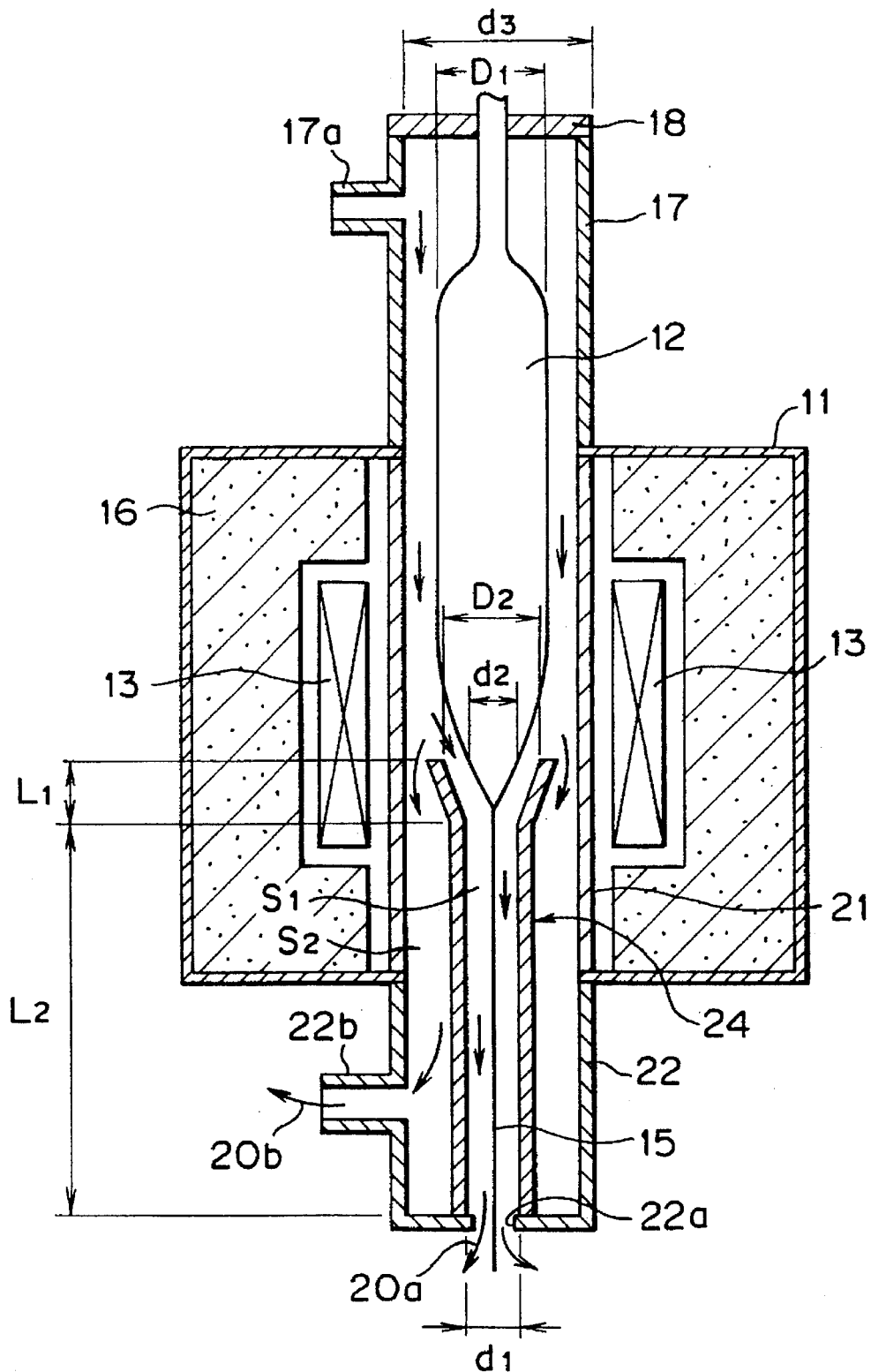
FIG. 5 is a cross sectional view showing a schematic structure of the optical fiber-drawing furnace used in Embodiment 3 of the present invention.

Next the specific structure of an inner furnace core tube was investigated and the results are detailed below with reference to FIG. 5. The structure of the drawing furnace shown in FIG. 5 is fundamentally identical to that shown in FIG. 3 and therefore, all the members, whose functions are identical to those of the members shown in FIG. 3, bear the same reference numerals and the explanation thereof are omitted to avoid duplication.

In this embodiment, an inner furnace core tube 24 comprised a cylindrical part 24a having an inner diameter $d_1$ of 30 mm and a length $L_2$ and a funnel-like part 24b whose upper end had an inner diameter $D_2$ of 69 mm and which had a length $L_1$ of 40 mm. Moreover, a cylindrical furnace core tube 21 used had an inner diameter $d_3$ of 95 mm. A preform 12 having an outer diameter $D_1$ of 70 mm was inserted into the furnace core tube 21 to carry out drawing.

Optical fibers were drawn using two kinds of inner furnace core tubes 24 having different lengths $L_1$ in which the upper ends of the funnel-like parts 24b were positioned at the level of the molten portions of the preforms having an outer diameter $D_2$ of 10 mm (Example 3-1) and 31 mm (Example 3-2), respectively.

The inert gas 20 was He which was supplied to the furnace at a flow rate of 30 l/min; the drawing speed of the optical fiber 15 was set at 500m/min.

Variation in the diameter of the resulting optical fiber 15 and vibrations thereof were determined at the position immediately below the drawing furnace using a laser measuring apparatus capable of determining the position of the optical fiber 15 as well.

As a result, the variation in the diameter and the vibration (amplitude) of the optical fiber were found to be ±0.2 μm and ±0.2 mm, respectively, for the optical fiber produced in Example 3-1 wherein the upper end of the funnel-like part 24b was positioned at the level of the molten portion of the preform having an outer diameter $D_2$ of 10 mm.

On the other hand, the variation and vibration observed for the optical fiber produced in Example 3-2 in which the upper end of the funnel-like part 24b was positioned at the level of the molten portion of the preform having an outer diameter $D_2$ of 31 mm were found to be ±0.15 μm (which was smaller than that observed in Example 3-1) and ±0.2 mm (identical to that observed in Example 3-1).

(Comparative Example 3)

Figure 2:
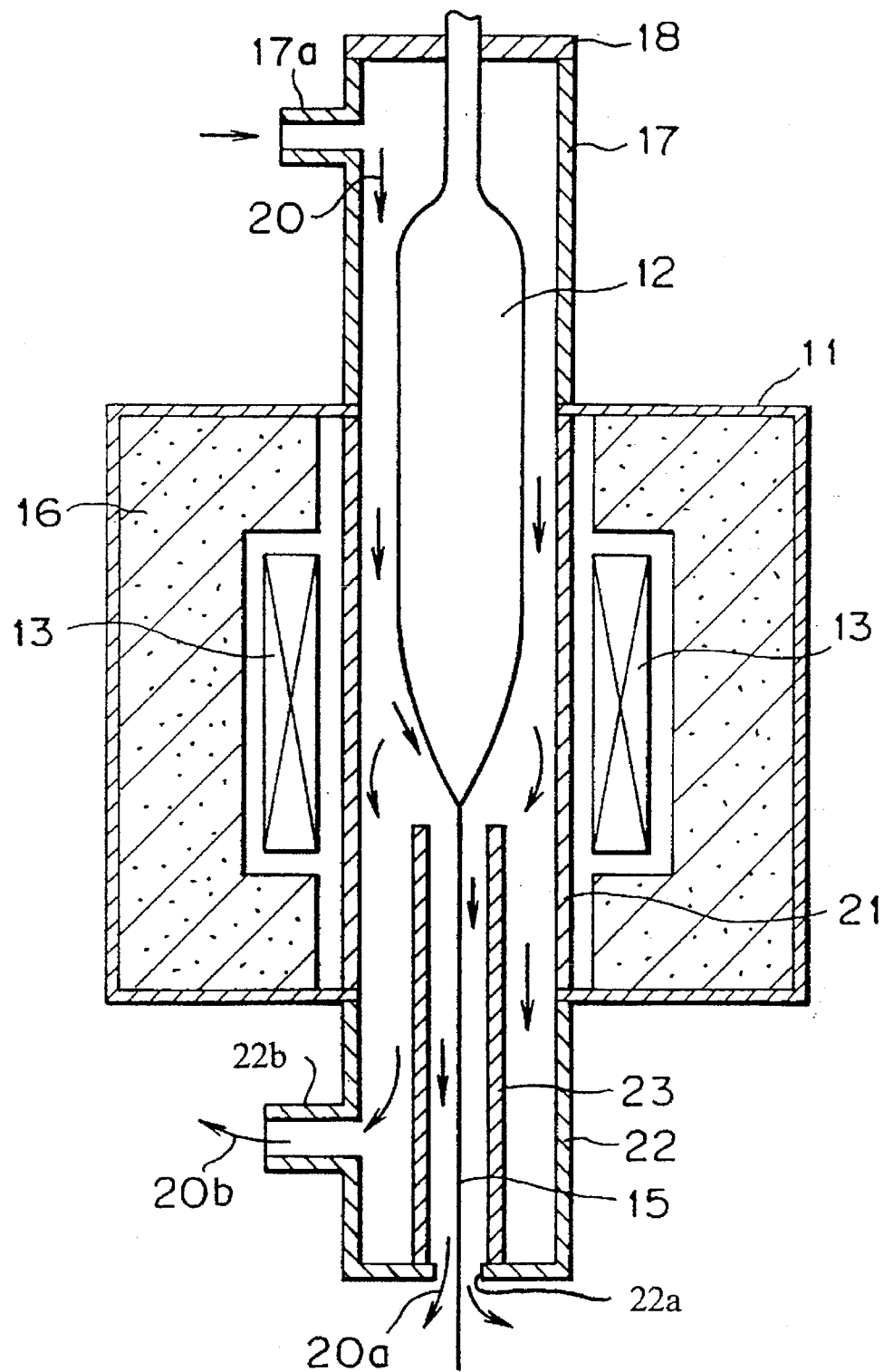
FIG. 2 is a cross sectional view showing a schematic structure of another conventional optical fiber-drawing furnace.

An optical fiber was produced using a drawing furnace as shown in FIG. 2. The second furnace core tube 22 of the drawing furnace was identical to the inner furnace core tube 24 used in Example 3, in which the upper end of the funnel-like part 24b was positioned at the level of the molten portion of the preform having an outer diameter $D_2$ of 31 mm and from which the funnel-like part 24b was removed. In other words, the upper end of the second furnace core tube 22 used in this Comparative Example was arranged at a position 40 mm lower than the level of the molten portion of the preform 12 having an outer diameter of 31 mm, and the outer diameter of the molten portion at the level of the upper end of the core tube 22 was about 2 mm. Other conditions were the same as those used in Example 3. Thus, the optical fiber was drawn from the preform.

In this case, the variation in the outer diameter of the resulting optical fiber was found to be ±0.4 μm. In addition, the vibrations (amplitude) of the optical fiber during the drawing operation were large, on the order of ±0.5 mm.

The shape and size of the funnel-like part of the inner furnace core tube used in the drawing furnace of the present invention as well as the position thereof within the furnace core chamber are preferably determined or selected depending on the shape of the molten portion of the preform. Moreover, the shape of the molten portion may vary depending on the outer diameter of the non-molten portion of the preform, the temperature distribution within the furnace core chamber, the optical fiber-drawing speed and the magnitude of the tension applied to the optical fiber during drawing. Accordingly, it is desirable to design the funnel-like part in such a manner that the shape, size and position thereof can appropriately be adjusted depending on these requirements.

Moreover, the shape of the inner face of the funnel-like part need not necessarily correspond with that of the outer face of the molten portion of the preform.

However, the present invention encompasses any shape capable of preventing any turbulent current in a gas flow and any increase in the gas flow rate in the vicinity of the molten portion of the preform. More specifically, the funnel-like part is desirably designed in such a manner that it has a shape and a size in which the diameter is gradually increased in an upward direction so that the part can surround the lower molten portion of the preform and so that a gap is formed between the upper outer face of the funnel-like part and the furnace core tube arranged outside the part. The shape of the inner face of the funnel-like part is not restricted to those specific ones arrangements may be, for instance, a cone, an elliptic paraboloid and a spherical shape.

The funnel-like part preferably surrounds at least the molten portion of the preform having a diameter of 10 mm. This is because the ambient atmosphere has the greatest influence on the molten portion, (which has a diameter of 10 mm or less) and consequently on the diameter of the resulting optical fiber. Therefore, if the upper end of the funnel-like part is positioned above the molten portion of the preform having a diameter of 10 mm, the effect of the ambient atmosphere on the diameter of the resulting optical fiber can be minimized.

In addition, the gap between the upper outer face of the funnel-like part and the furnace core tube arranged outside the part is, for instance, selected in such a manner that the inert gas introduced through the upper portion of the furnace core chamber is divided into two streams, i.e., a gas stream which flows into the inner furnace core tube and a gas stream which flows into the space outside the inner furnace core tube through the gap. As a result, the flow rate of the gas near the preform is not so great that it adversely affects the diameter of the resulting optical fiber.

Figure 6:
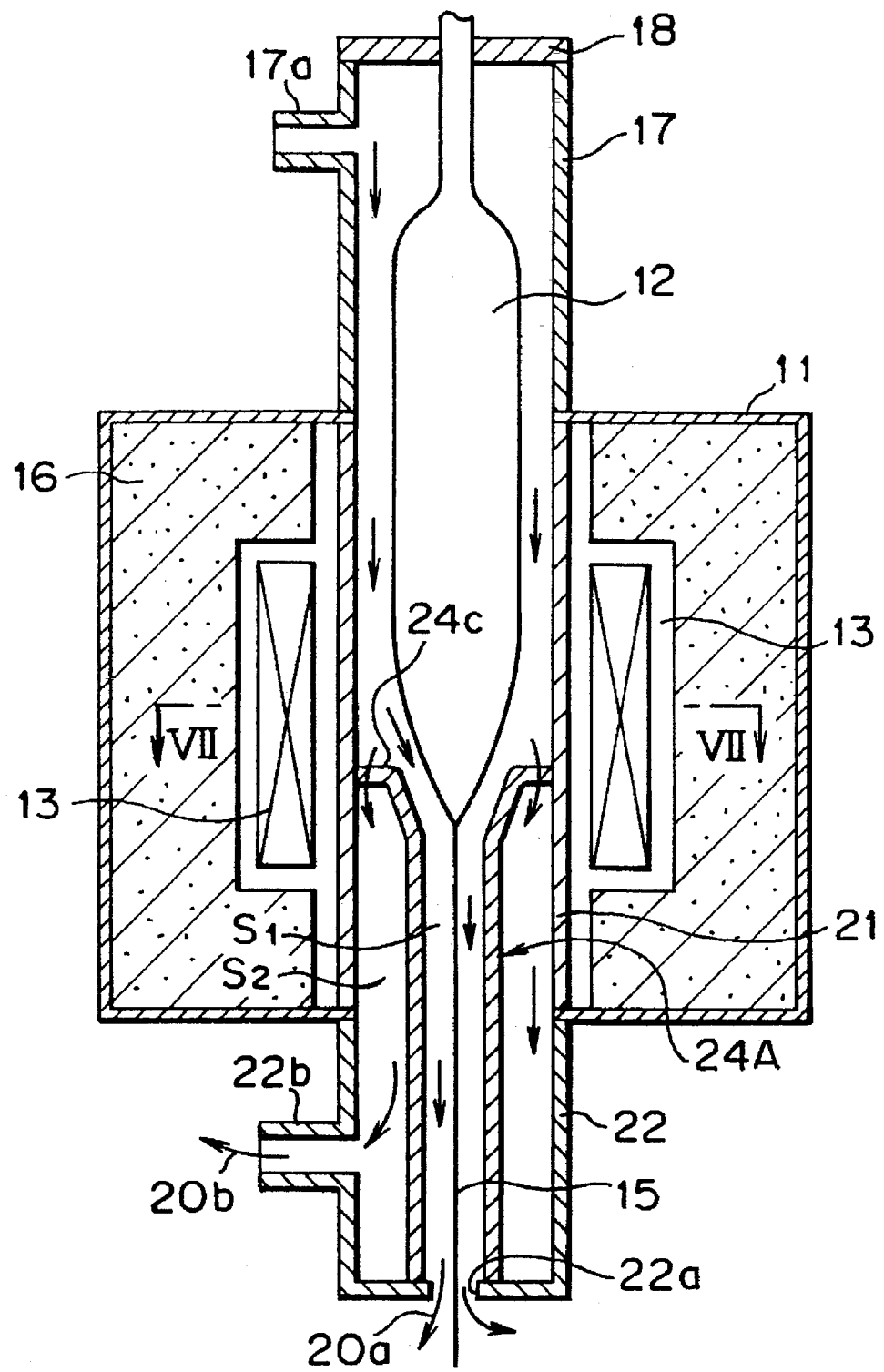
FIG. 6 is a cross sectional view showing a schematic structure of the optical fiber-drawing furnace according to a still another embodiment of the present invention.
Figure 7:
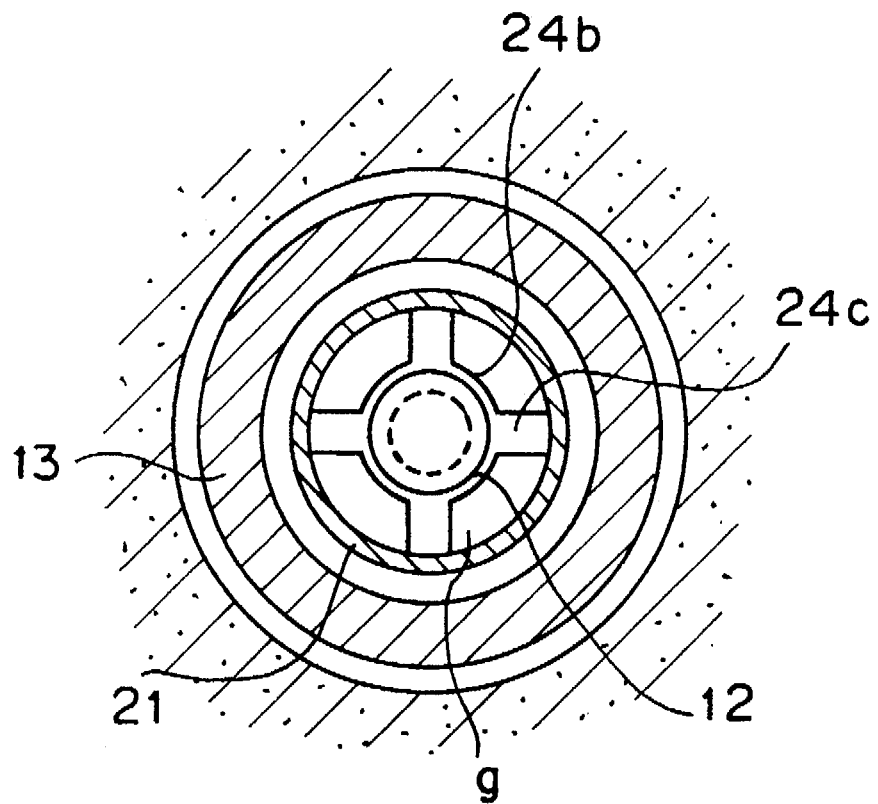
FIG. 7 is a cross sectional view of the structure shown in FIG. 6, taken along the line VII—VII.

Therefore, a part of the outer face of the upper portion of the funnel-like part may come in contact with the inner wall of the structure defining furnace core chamber. Embodiments relating to these cases are shown in FIGS. 6 and 7. In FIGS. 6 and 7, all the members, whose functions are identical to those of the member shown in FIG. 5, bear the same reference numerals and the details thereof are omitted to avoid duplication. FIG. 7 is a cross sectional view of the embodiment shown in FIG. 6 taken along the line VII—VII.

The drawing furnace according to this embodiment is equipped with an inner furnace core tube 24A. The inner furnace core tube 24A is fundamentally identical to the inner furnace core tube 24 shown in FIG. 5. However, the core tube 24A differs from the inner furnace core tube 24 shown in FIG. 3 in that the former has a plurality of projections 24c (four projections in this embodiment) which extend from the upper periphery of the funnel-like part 24b and whose tips come in contact with the inner wall of the cylindrical furnace core tube 21. In this case, the gap g is formed between the upper periphery of the funnel-like part 24b free of the projections 24c and the cylindrical furnace core tube 21.

An optical fiber was produced using the drawing furnace of this embodiment and as a result, the variation in the diameter of the optical fiber and the vibrations thereof were found to be approximately identical to those observed in Example 3.

The inner furnace core tube 24A shown in FIG. 6 also shows an effect that the positioning thereof with respect to the cylindrical furnace core tube 21 is very easy as compared with the positioning of the inner furnace core tube 24 shown in FIG. 5.

In such a drawing furnace, the flow rate of the gas, which passes through the gap g and is then discharged from the port 22b, depends on the sectional area of the port 22b which is smaller than the cross sectional area of the gap g. Therefore, the cross sectional area of the gap g is not limited to a particular value because the gap g is sufficiently greater than that of the port 22b (for instance, three to four times).

Embodiments other than that shown in FIG. 6 include those in which the upper periphery of the funnel-like part comes in contact with the cylindrical furnace core tube and through holes are formed on the funnel-like part.

Alternatively, in this case, the cylindrical furnace core tube and the funnel-like part can be united at the position of the core tube above the portion coming in contact with the funnel-like part.

In the Embodiments detailed above, the cylindrical furnace core tube and the inner furnace core tube used are in general made of a carbon material while taking into consideration the influence thereof on the drawn optical fibers, but they may be formed from other materials. Moreover, an electric heater such as a carbon heater is used in the drawing furnaces according to the foregoing Embodiments, but it is clear that the present invention can likewise be applied to drawing furnaces provided with an induction heater. A carbon fiber is illustrated as a heat insulating material used in the furnace body, but other materials can be used so long as they have a heat insulating effect. In this respect, if a carbon heater and a heat insulating material comprising a carbon fiber are used, the carbon material is in general protected from any oxidation by passing an argon gas through the furnace body. The materials for the furnace body, the upper cylindrical member and the lower cylindrical member are not restricted to the specific ones mentioned above and may be ceramics in addition to metals such as stainless steel.

As has been described above in detail in connection with specific embodiments, the present invention permits the reduction of the space around the molten portion of a preform and the prevention of any occurrence of a turbulent current of a gas stream by arranging, within a furnace core chamber, an inner furnace core tube provided with a funnel-like part which surrounds the molten portion of the preform. Moreover, since only a portion of a heated inert gas flows into the inner furnace core tube, the flow rate of the gas near the molten portion is not significantly increased. For this reason, the present invention permits the suppression of any vibration of optical fibers during drawing and any variation in the diameters thereof.

In addition, the furnace core chamber has a double-structure since the drawing furnace is equipped with the inner furnace core tube. Therefore the drawn optical fiber is not directly cooled by the outside air, unlike the conventional furnaces, since the optical fiber passes through the inner furnace core tube. As a result, the drawn optical fiber is gradually cooled and thus the variation in the diameter can further be reduced.

Furthermore, a gas passing downwardly through the furnace serves to absorb an increase or variation in the pressure and to improve the thermal insulation effect at the lower chimney. On the other hand if a gas is passed upward through the furnace, the molten portion and the optical fiber does not come in contact with a cold gas since the gas is heated within the space in the furnace core tube and is only then supplied to the interior of the furnace. Thus, the variation in the diameter can further be suppressed and an optical fiber having a uniform diameter can be produced.

What is claimed is:

1. A furnace for drawing an optical fiber comprising:
   a structure having an inner surface defining a furnace core chamber having an upper end suitable for receiving an optical fiber preform and a lower end with an opening therein, said opening being suitable for removing a drawn optical fiber therethrough;
   a gas-supply means for introducing an inert gas into said furnace core chamber to thus establish an inert gas atmosphere within said furnace core chamber;
   a heating means for heating the preform so that a lower part of the preform is molten and suitable for drawing into the drawn optical fiber, said heating means being positioned around a periphery of said structure; and
   an inner furnace core tube positioned within said furnace core chamber, said inner furnace core tube comprising a cylindrical part and a funnel-like part, said cylindrical part being in communication with said opening of said furnace core chamber, said funnel-like part being positioned on an upper end of said cylindrical part and having a diameter gradually and upwardly increased so as to be suitable for surrounding at least a portion of the lower part of the preform,
   wherein at least a portion of an upper periphery of said funnel-like part is spaced from the inner surface of said structure.

2. A furnace as claimed in claim 1, wherein a first space is defined between said inner surface of said structure and an outer surface of said inner furnace core tube, and wherein a second space is defined by an inner surface of said inner furnace core tube.

3. A furnace as claimed in claim 1, wherein an upper end of said funnel-like part of said inner furnace core tube is constructed and arranged to allow said upper end of said funnel-like part to be positioned above the lower part of the preform received in said furnace core chamber, said preform having an outer diameter of at least 10 mm.

4. A furnace as claimed in claim 1, wherein at least one projection connects said portion of said upper periphery of said funnel-like part of said inner furnace core tube to said inner surface of said structure.

5. A furnace as claimed in any one of claims 1, 2, 3, or 4 wherein said structure comprises an intermediate cylindrical furnace core member, an upper cylindrical member being in communication with an upper end of said intermediate cylindrical furnace core member and having a first port, and a lower cylindrical member being in communication with a lower end of said intermediate cylindrical furnace core member and having a second port.

6. A method of drawing an optical fiber comprising the steps of:
   providing a structure having an inner surface defining a furnace core chamber,
   inserting a preform through an upper end of the furnace core chamber, the furnace core chamber containing an inner furnace core tube comprising a cylindrical part and a funnel-like part, the cylindrical part being in communication with a lower opening of the furnace core chamber, the funnel-like part having a diameter gradually and upwardly increased, at least a portion of an upper periphery of the funnel-like part being spaced from the inner surface of the structure;
   supplying an inert gas to the furnace core chamber to establish an inert gas atmosphere within the chamber;
   melting a lower portion of the preform by operating a heating means to obtain a molten portion of the preform, the heating means being positioned around a periphery of said structure, while arranging a lower end of the molten portion so as to be surrounded by the funnel-like part of the inner furnace core tube;
   drawing the molten portion to obtain an optical fiber; and
   removing the optical fiber through the lower opening.

7. A method as claimed in claim 6, wherein said supplying step comprises introducing the inert gas to the chamber through an upper part of the furnace core chamber, said method further comprising:
   passing a first portion of the inert gas through the inner furnace core tube, and thereafter discharging the first portion of the gas through the lower opening; and passing a second portion of the gas through a space defined between an outer surface of the inner furnace core tube and the inner surface of the structure, and thereafter discharging the second portion through a discharge port formed in a lower portion of the furnace core chamber.

8. A method for drawing an optical fiber comprising the steps of:

providing a structure having an inner surface defining a furnace core chamber, inserting the preform through an upper end of the furnace core chamber, the furnace core chamber containing an inner furnace core tube comprising a cylindrical part and a funnel-like part, the cylindrical part being in communication with a lower opening of the chamber, the funnel-like part having a diameter gradually and upwardly increased, at least a portion of an upper periphery of the funnel-like part being spaced from the inner surface of the structure;

introducing an inert gas to the furnace core chamber through a first port formed in a lower portion of the furnace core chamber;

heating the inert gas by passing the inert gas through a first space defined between the inner surface of the structure and an outer surface of the inner furnace core tube;

passing a first portion of the inert gas through a second space defined by an inner surface of the inner furnace core tube and discharging the first portion of the inert gas through the lower opening of the furnace core chamber; and passing a second portion of the inert gas through the furnace core chamber and discharging the second portion of the inert gas through a second port positioned at an upper portion of the furnace core chamber.

9. A furnace as claimed in claim 4, wherein said structure comprises an intermediate cylindrical furnace core member, an upper cylindrical member being in communication with an upper end of said intermediate cylindrical furnace core member and having a first port, and a lower cylindrical member being in communication with a lower end of said intermediate cylindrical furnace core member and having a second port.

10. A furnace as claimed in claim 3, wherein at least one projection connects said portion of the upper periphery of said funnel-like part of said inner furnace core tube to said inner surface of said structure.

11. A furnace as claimed in claim 10, wherein said structure comprises an intermediate cylindrical furnace core member, an upper cylindrical member being in communication with an upper end of said intermediate cylindrical furnace core member and having a first port, and a lower cylindrical member being in communication with a lower end of said intermediate cylindrical furnace core member and having a second port.

* * * * *